United States Patent
Ryu et al.

(10) Patent No.: US 8,643,289 B2
(45) Date of Patent: Feb. 4, 2014

(54) PWM CONTROLLING CIRCUIT AND LED DRIVER CIRCUIT HAVING THE SAME

(75) Inventors: Beom-seon Ryu, Cheongju-si (KR); Chang-sik Lim, Cheongju-si (KR); Jin-wook Kim, Cheongju-si (KR)

(73) Assignee: Magnachip Semiconductor, Ltd., Cheongju-si (KR)

( * ) Notice: Subject to any disclaimer, the term of this patent is extended or adjusted under 35 U.S.C. 154(b) by 161 days.

(21) Appl. No.: 13/397,936

(22) Filed: Feb. 16, 2012

(65) Prior Publication Data

US 2012/0212142 A1 Aug. 23, 2012

(30) Foreign Application Priority Data

Feb. 18, 2011 (KR) .................. 10-2011-0014795

(51) Int. Cl.
*H05B 37/02* (2006.01)
(52) U.S. Cl.
USPC ............................ 315/186; 315/122; 315/219
(58) Field of Classification Search
None
See application file for complete search history.

(56) References Cited

U.S. PATENT DOCUMENTS

| | | | | |
|---|---|---|---|---|
| 6,104,737 A | * | 8/2000 | Mahmoudi | 372/38.04 |
| 8,148,911 B2 | * | 4/2012 | Chen et al. | 315/250 |
| 8,456,096 B2 | * | 6/2013 | Kwok et al. | 315/219 |
| 2002/0039298 A1 | * | 4/2002 | Riggio et al. | 363/22 |
| 2010/0148679 A1 | * | 6/2010 | Chen et al. | 315/185 R |
| 2011/0193542 A1 | * | 8/2011 | Kwok et al. | 323/284 |

* cited by examiner

*Primary Examiner* — Crystal L Hammond
(74) *Attorney, Agent, or Firm* — NSIP Law

(57) ABSTRACT

A Pulse Width Modulation (PWM) controlling circuit and a Light Emitting Diode (LED) driver circuit having the same are provided. An LED driver circuit includes a voltage detector connected to a plurality of LED arrays, the voltage detector being configured to determine a connection status of each of the LED arrays according to a corresponding level of the feedback voltage, and detect a minimum feedback voltage from feedback voltages of the LED arrays that are determined to be connected, a controller configured to output a control signal to one of abort and control boosting of the LED arrays according to the detected minimum feedback voltage, and a Pulse Width Modulation (PWM) signal generator configured to output a PWM signal corresponding to the outputted control signal according to an on/off state of a dimming signal that drives the LED arrays that are determined to be connected.

16 Claims, 8 Drawing Sheets

PWM CONTROLLING CIRCUIT AND LED DRIVER CIRCUIT HAVING THE SAME

CROSS-REFERENCE TO RELATED APPLICATIONS

This application claims the benefit under 35 U.S.C. §119 (a) from Korean Patent Application No. 10-2011-0014795 filed on Feb. 18, 2011 in the Korean Intellectual Property Office, the entire disclosure of which is incorporated herein by reference for all purposes.

BACKGROUND

1. Field

The following description relates to a Pulse Width Modulation (PWM) controlling circuit and a Light Emitting Diode (LED) driver circuit having the same. For example, the following description relates to a PWM controlling circuit to generate a PWM signal to control boosting of an LED array according to connection state of a plurality of LED arrays, and an LED driver circuit using the same.

2. Description of Related Art

A Liquid Crystal Display (LCD) is not as thick and weighs less than other display devices. In addition, the LCD requires low driving voltage and power consumption. However, the LCD requires light to operate. As such, since the LCD is a non-light-emitting device that cannot produce light it needs to operate as a display device, a separate backlight is required.

A Cold Cathode Fluorescent Lamp (CCFL) and a plurality of Light Emitting Diodes (LEDs) are used as backlight for the LCD. However, the CCFL can pollute the environment with mercury. In addition, the CCFL exhibits slow response time and low color reproduction, and is not suitable for use in a panel of the LCD that is thin and light.

On the other hand, LEDs are eco-friendly without using harmful substances and allow impulse driving. In addition, LEDs exhibit good color reproduction, arbitrarily change brightness and color temperature by adjusting the light intensity of red, green, and blue LEDs, and are suitable for use in a panel of the LCD that is thin and light. Therefore, LEDs are mostly implemented as the backlight light source for LCD panels.

Meanwhile, when the LCD backlight using the LEDs connects LED arrays including a plurality of LEDs in parallel, a driver circuit supplies constant current to each LED array. Further, a dimming circuit arbitrarily adjusts the brightness and the color temperature to compensate for the temperature.

To maintain uniform brightness and color in the backlight, the driver circuit boosts the driving voltage applied to the LED array. In this case, when the LEDs forming the LED array are open, the voltage of a particular node of the LED array becomes grounded (GND) in the LED Integrated Circuit (IC). Accordingly, the driver circuit performs a continuous boosting operation. At this time, without an overvoltage protection device for the driving voltage applied to the LED array, the boosting of the driving voltage destroys the LED IC.

To prevent this problem, a conventional overvoltage protection technique detects the voltage of a particular node where the driving voltage applied to the LED arrays is divided by a resistor array, and aborts the boosting when the voltage of the particular node exceeds a reference threshold. However, since the driving voltage applied to the LED array is changed according to the change of the LED inch, the conventional technique should separately adjust the resistance value of the resistor array every time the LED inch is changed. As a result, development and test process costs increase.

To supply the constant current to the LED array, it is necessary to fully boost the driving voltage applied to the LED array. However, to increase the driving voltage of the LED array in the conventional technique, the driving voltage is not boosted when a dimming signal is off and is boosted only when the dimming signal is on. Disadvantageously, it takes a long time to fully increase the driving voltage of the LED array.

SUMMARY

In one general aspect, there is provided a Light Emitting Diode (LED) driver circuit, including a voltage detector connected to a plurality of LED arrays, the voltage detector being configured to receive a feedback voltage from each of the LED arrays, determine a connection status of each of the LED arrays according to a corresponding level of the feedback voltage, and detect a minimum feedback voltage from feedback voltages of the LED arrays that are determined to be connected, a controller configured to output a control signal to one of abort and control boosting of the LED arrays according to the detected minimum feedback voltage, a Pulse Width Modulation (PWM) signal generator configured to output a PWM signal corresponding to the outputted control signal according to an on/off state of a dimming signal that drives the LED arrays that are determined to be connected, and a driving voltage generator configured to commonly apply a driving voltage to the LED arrays according to the outputted PWM signal.

A general aspect of the LED driver circuit may further provide a feedback unit configured to detect the driving voltage commonly applied to the LED arrays, and output a feedback signal to the controller according to the detected driving voltage. When determining that none of the LED arrays are connected, the controller outputs the control signal to abort the boosting according to the feedback signal.

A general aspect of the LED driver circuit may further provide that the controller includes a comparator configured to compare the feedback signal and a preset voltage, and generate the control signal according to the comparison.

A general aspect of the LED driver circuit may further provide that the controller generates a high control signal when the feedback signal is greater than the preset voltage, and, when the high control signal is input to the PWM signal generator, the PWM signal generator generates the PWM signal corresponding to the control signal to abort the boosting.

A general aspect of the LED driver circuit may further provide that the driving voltage detector is further configured to compare the feedback voltage of each of the LED arrays and a preset voltage, and determine the connection status of each of the LED arrays according to the comparison.

A general aspect of the LED driver circuit may further provide that the preset voltage is 0 V or 0.2 V.

A general aspect of the LED driver circuit may further provide that the driving voltage is a target voltage supplied to the LED arrays to operate a transistor that, in a saturation region, drives the LED arrays that are determined to be connected.

A general aspect of the LED driver circuit may further provide that a drain voltage of the transistor is increased to control the boosting of the LED arrays according to the on/off state of the dimming signal.

A general aspect of the LED driver circuit may further provide that the controller includes a comparator configured to compare the minimum feedback voltage and a preset voltage, the preset voltage being less than a voltage to operate a transistor that, in a saturation region, drives the LED arrays that are determined to be connected, and generate the control signal according to the comparison.

A general aspect of the LED driver circuit may further provide that the controller generates a high control signal when one of the feedback voltages of the LED arrays that are determined to be connected is greater than the preset voltage, and, when the high control signal is input to the PWM signal generator and the dimming signal is on, the PWM signal generator generates the PWM signal corresponding to the control signal to control the boosting.

A general aspect of the LED driver circuit may further provide that the PWM signal generator generates the PWM signal corresponding to the control signal to abort the boosting when the dimming signal is off.

A general aspect of the LED driver circuit may further provide that the PWM signal corresponding to the control signal to control the boosting boosts the feedback voltage of the LED arrays that are determined to be connected to a voltage to operate the transistor that, in a saturation region, drives the LED arrays that are determined to be connected.

In another general aspect, there is provided a Pulse Width Modulation (PWM) controlling circuit, including a voltage detector connected to a plurality of Light Emitting Diode (LED) arrays, the voltage detector being configured to receive a feedback voltage from each of the LED arrays, determine a connection status of each of the LED arrays according to a corresponding level of the feedback voltage, and output a control voltage to control boosting of the LED arrays according to the feedback voltages of the LED arrays that are determined to be connected, and a PWM signal generator configured to output a PWM signal corresponding to the outputted control voltage to control the boosting of the LED arrays according to an on/off state of a dimming signal that drives the LED arrays that are determined to be connected.

In another general aspect, there is provided a Light Emitting Diode (LED) driver circuit, including an LED array unit including a plurality of LED arrays, a driving voltage generator configured to provide a driving voltage to the LED array unit, and a Pulse Width Modulation (PWM) controlling circuit configured to boost the driving voltage to the LED array unit if a dimming signal is on and one or more of the LED arrays is connected, the PWM controlling circuit being configured to receive a feedback voltage from each of the LED arrays, and determine from the received feedback voltage if one or more of the LED arrays is connected.

Another general aspect of the LED driver circuit may further provide that the PWM controlling circuit includes a PWM signal generator configured to determine whether the dimming signal is on, receive a control signal corresponding to whether one or more of the LED arrays is connected, output a first PWM signal to the driving voltage generator instructing the driving voltage generator to boost the driving voltage if the control signal indicates that one or more of the LED arrays is connected and the dimming signal is on, and output a second PWM signal to the driving voltage generator instructing the driving voltage generator to abort boosting of the driving voltage if the control signal indicates that one or more of the LED arrays is not connected, the dimming signal is off, or a combination thereof.

Another general aspect of the LED driver circuit may further provide the PWM controlling circuit includes a controller configured to receive a minimum feedback voltage of the feedback voltages provided from the LED arrays if one or more of the LED arrays is connected, output a control signal to boost the driving voltage corresponding to the minimum feedback voltage, and a PWM signal generator configured to receive the outputted control signal, and output a PWM signal to the driving voltage generator to boost the driving voltage in accordance with the received control signal if the dimming signal is on.

Other features and aspects may be apparent from the following detailed description, the drawings, and the claims.

Figure 1:
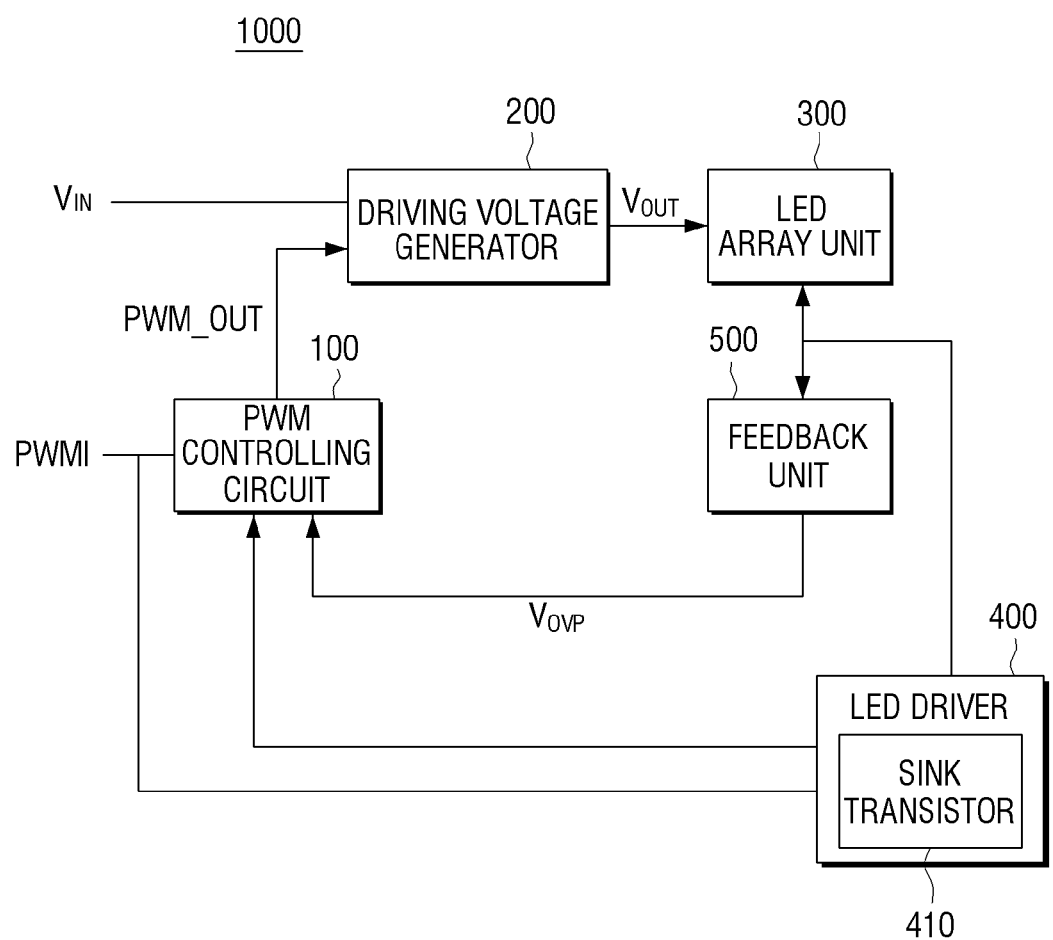
FIG. 1 is a block diagram illustrating an example of an LED driver circuit according to a general aspect.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

FIG. 1 is a block diagram illustrating an example of an LED driver circuit 1000 according to a general aspect. Referring to FIG. 1, the LED driver circuit 1000 includes a Pulse Width Modulation (PWM) controlling circuit 100, a driving voltage generator 200, an LED array unit 300, an LED driver 400, and a feedback unit 500.

The LED driver circuit 1000 prevents overvoltage from being applied to an LED array unit 300 according to connection status of LED arrays within the LED array unit 300. For example, when every LED array of the LED array unit 300 is disconnected, the LED driver circuit 1000 receives, from the feedback unit 500, a fed-back driving voltage applied to the LED array unit 300, and uses the fed-back driving voltage to control boosting of a driving voltage $V_{OUT}$ to the LED arrays of the LED array unit 300. On the other hand, when at least one LED array of the LED array unit 300 is connected, the LED driver circuit 1000 receives a minimum drain voltage (hereafter, also referred to as a minimum feedback voltage of the feedback voltages of the LED array), which is fed back, of drain voltages of a sink transistor 410 of the LED driver 400 to drive the LED arrays of the LED array unit 300, and uses the minimum drain voltage to control boosting of the driving voltage $V_{OUT}$ to the LED arrays of the LED array unit 300.

Herein, the boosting control of the LED driver circuit 1000 by using the driving voltage feedback can be referred to as external overvoltage protection, as the driving voltage $V_{OUT}$ applied to the LED arrays of the LED array unit 300 is divided through an external resistor array of the feedback unit 500.

The divided driving voltage is used by the LED driver circuit 1000 to control the boosting of the driving voltage $V_{OUT}$ to the LED arrays of the LED array unit 300. The boosting control of the LED driver circuit 1000 based on the feedback of the minimum drain voltage of the sink transistor 410 of the LED driver 400 driving the LED arrays of the LED array unit 300 can be referred to as internal overvoltage protection, as the drain voltage of the sink transistor 410 and the LED driver 400 is used by the LED driver circuit 1000 to control the boosting of the driving voltage $V_{OUT}$ to the LED arrays of the LED array unit 300. That is, the LED driver circuit 1000 can serve as an overvoltage protection circuit for preventing the overvoltage applied to the LED arrays of the LED array unit 300 using external overvoltage protection and internal overvoltage protection.

The PWM controlling circuit 100 is connected to the LED arrays of the LED array unit 300. The PWM controlling circuit 100 receives a feedback voltage from each LED array of the LED array unit 300, and determines the connection status of the LED arrays of the LED array unit 300 according to the levels of the received feedback voltages. Herein, the feedback voltage of each of the LED arrays indicates a drain voltage of the sink transistor 410 of the LED driver 400 to drive each of the LED arrays of the LED array unit 300.

The PWM controlling circuit 100 generates a control signal to control the boosting of the LED arrays of the LED array unit 300 according to the connection status of the LED arrays and an on/off state of a dimming signal PWMI, and outputs a PWM signal PWM_OUT corresponding to the control signal. For example, upon determining that none of the LED arrays are connected, the PWM controlling circuit 100 can generate a control signal to abort the boosting of the LED arrays of the LED array unit 300 by using the driving voltage $V_{OUT}$ commonly applied to the LED arrays of the LED array unit 300.

On the other hand, when at least one LED array is connected, the PWM controlling circuit 100 detects the minimum feedback voltage of the feedback voltages of the LED arrays that are determined to be connected, and generates a control signal to control the boosting of the LED arrays according to the detected minimum feedback voltage and the on/off state of the dimming signal PWMI. That is, the PWM controlling circuit 100 can receive the minimum drain voltage of the drain voltages of the sink transistor 410 of the LED driver 400 to drive the LED arrays that are determined to be connected, and generate the control signal to control the boosting of the LED arrays according to the on/off state of the dimming signal PWMI.

Figure 3:
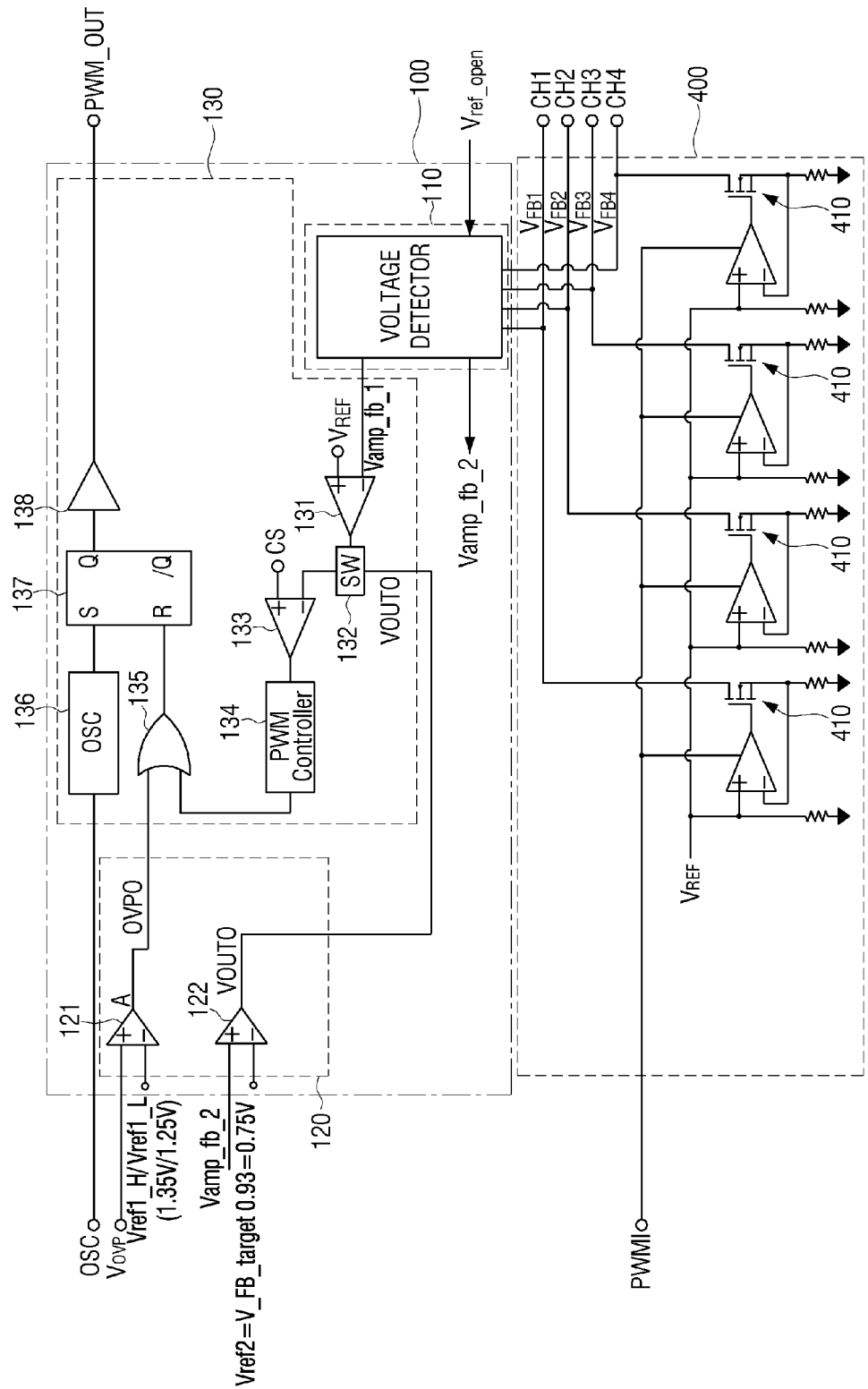
FIG. 3 is a circuit diagram illustrating an example of a PWM controlling circuit and a LED driver according to a general aspect.

Operations and structure of the PWM controlling circuit 100 shall be described by referring to FIG. 3.

The driving voltage generator 200 supplies the driving voltage $V_{OUT}$ to the LED arrays of the LED array unit 300 according to the PWM signal PWM_OUT. For example, the driving voltage generator 200 converts DC voltage $V_{IN}$ based on the PWM signal PWM_OUT generated by the PWM controlling circuit 100, and supplies the converted DC voltage as the driving voltage $V_{OUT}$ to the LED arrays of the LED array unit 300.

Figure 5:
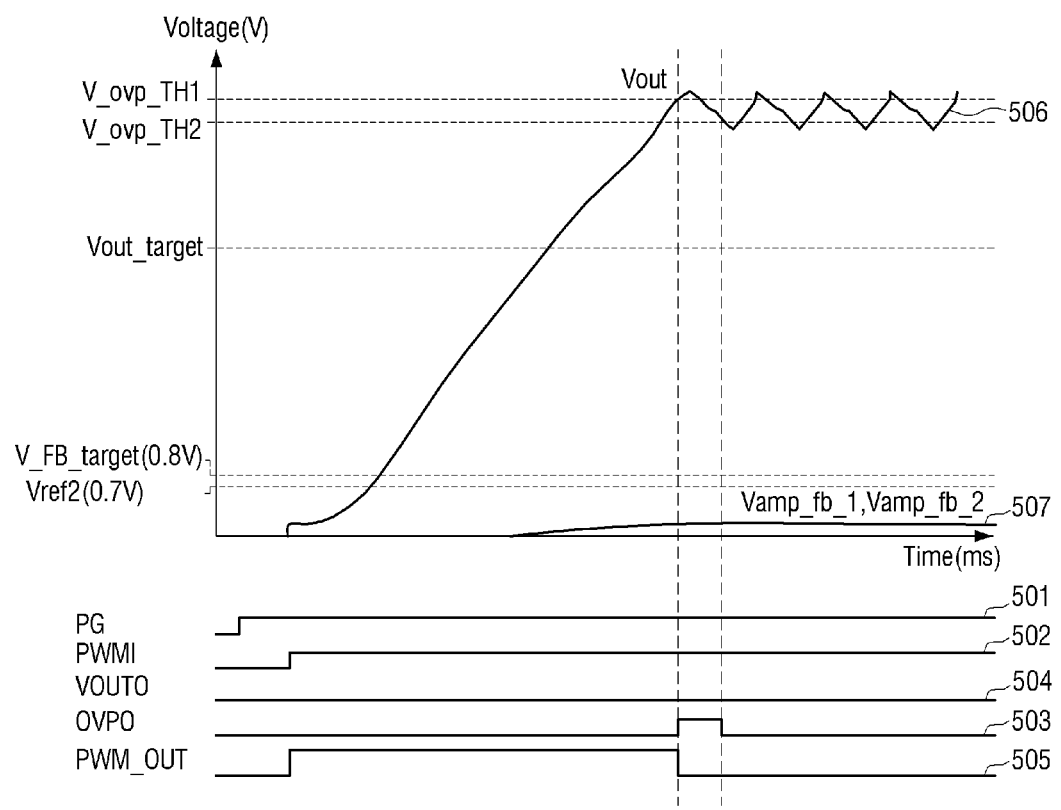
FIGS. 5 through 8 are waveform diagrams illustrating examples of operations of the LED driver circuit according to a general aspect.
Figure 6:
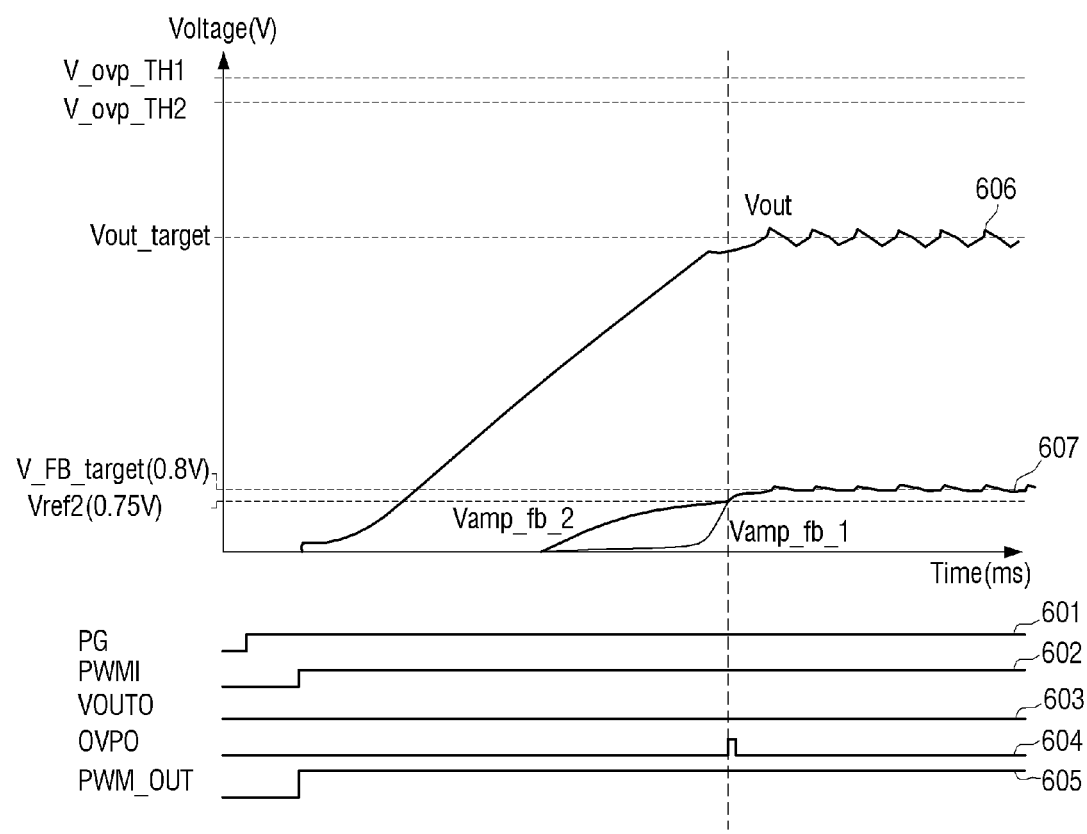
Figure 7:
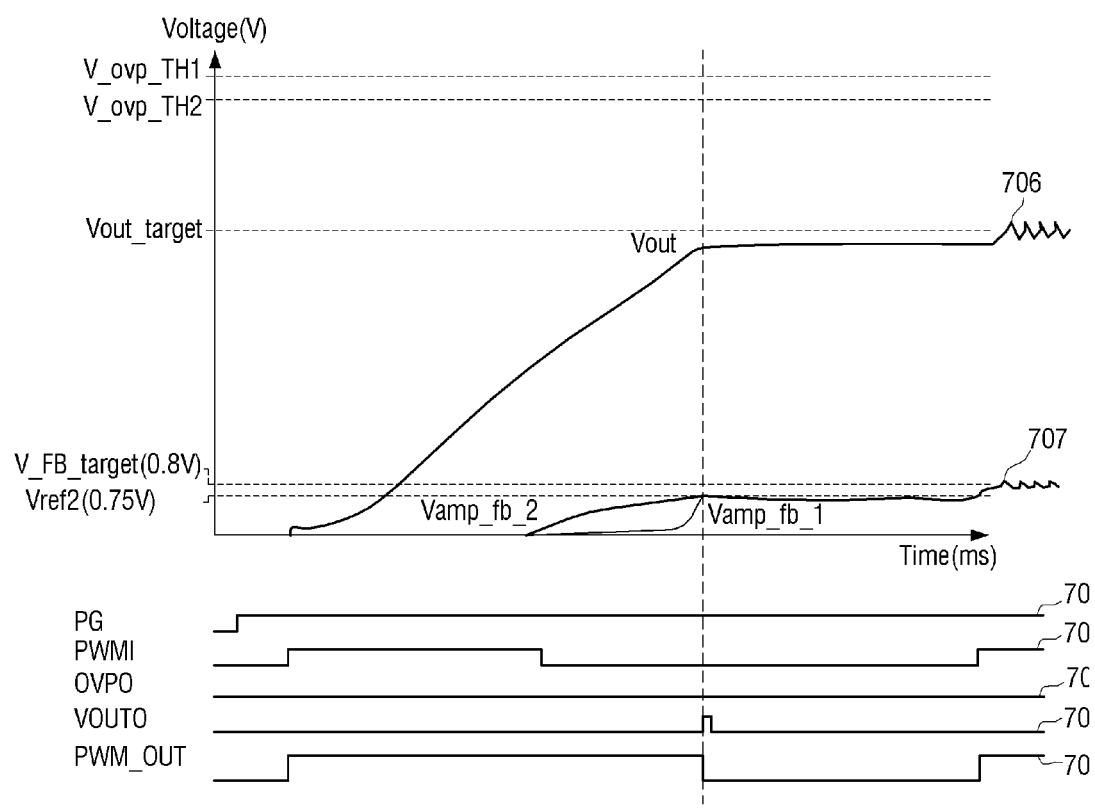

At this time, the driving voltage generator 200 may generate a target voltage Vout_target (e.g., as illustrated in FIGS. 5-7) to be supplied to the LED arrays of the LED array unit 300, in order to operate the sink transistor 410 of the LED driver 400 of the LED array unit 300 in a saturation region. The LED arrays of the LED array unit 300 are connected in parallel and commonly receive the driving voltage $V_{OUT}$ generated by the driving voltage generator 200.

The LED driver 400 may adjust the driving current of the LED array unit 300 by using the PWM signal and the dimming signal PWMI. For example, the LED driver 400 includes the sink transistor 410 to drive the LED arrays of the LED array unit 300, and functions as a constant current controller to control a flow of the constant current through the LED arrays of the LED array unit 300 by using the dimming signal PWMI.

The feedback unit 500 detects the driving voltage $V_{OUT}$ commonly applied to the LED arrays of the LED array unit 300 and outputs a feedback signal $V_{OVP}$. For example, the feedback unit 500 divides the driving voltage $V_{OUT}$ commonly applied to the LED arrays of the LED array unit 300 and provides the divided voltage to the PWM controlling circuit 100 as the feedback signal $V_{OVP}$. To divide the driving voltage $V_{OUT}$, the feedback unit 500 includes a resistor array including resistors R_OVPH and R_OVPL, as illustrated in FIG. 2, having a preset resistance value.

Figure 2:
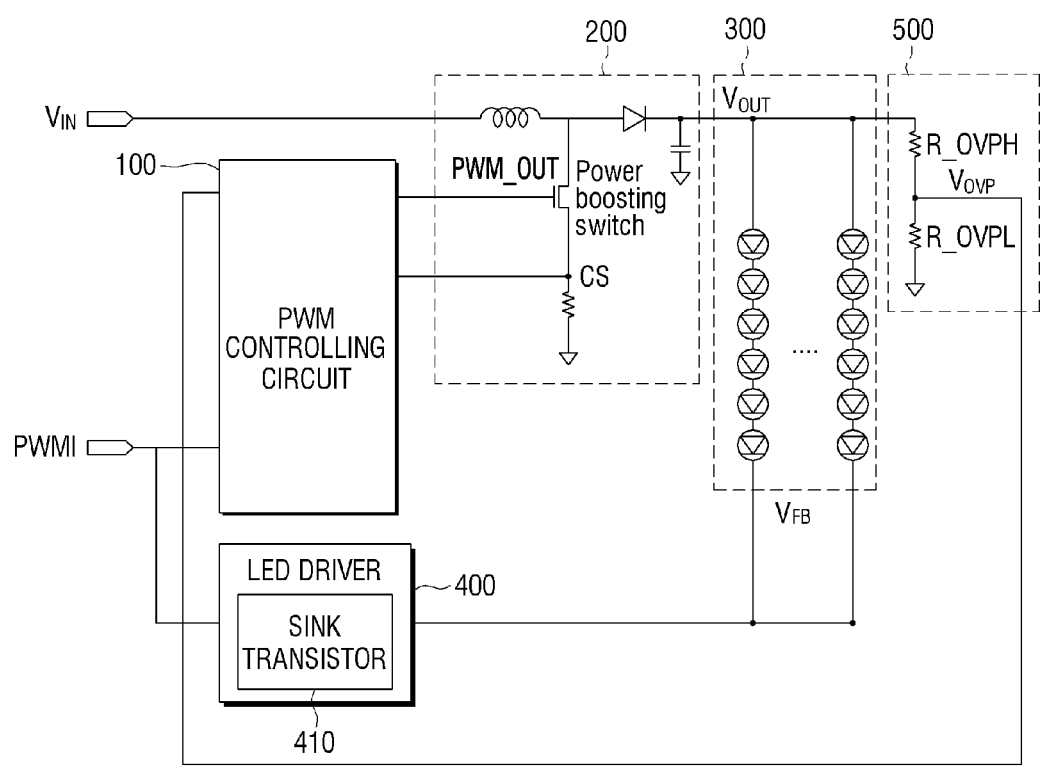
FIG. 2 is a circuit diagram illustrating an example of the LED driver circuit according to a general aspect.

FIG. 2 is a circuit diagram illustrating an example of the LED driver circuit 1000 according to a general aspect. Referring to FIG. 2, the LED driver circuit 1000 includes the PWM controlling circuit 100, the driving voltage generator 200, the LED array unit 300, the LED driver 400, and the feedback unit 500. The PWM controlling circuit 100, the driving voltage generator 200, the LED array unit 300, the LED driver 400, and the feedback unit 500 can be implemented as a single chip. Parts of FIG. 1 that overlap with FIG. 2 are omitted.

The PWM controlling circuit 100 connected to the LED arrays of the LED array unit 300 determines the connection status of the LED arrays and generates the PWM signal PWM_OUT to control the boosting of the LED arrays of the LED array unit 300 according to the connection status. For doing so, the PWM controlling circuit 100 uses either the feedback signal $V_{OVP}$ from the feedback unit 500 or the minimum drain voltage of the sink transistor 410 of the LED driver 400 to drive the LED arrays that are connected as the minimum feedback voltage of the LED arrays of the LED array unit 300.

The driving voltage generator 200 can include an inductor, a power boosting switch, and a booster switcher including a diode. For example, the driving voltage generator 200 performs the same operations as a general booster switcher by boosting the driving voltage $V_{OUT}$ supplied to the LED arrays of the LED array unit 300 according to the PWM signal PWM_OUT. The LED array unit 300 includes a plurality of LED arrays connected in parallel. The LED driver 400, as a constant current controller, controls the flow of the constant current in each of the LED arrays of the LED array unit 300.

The feedback unit 500 includes resistors R_OVPH and R_OVPL to divide the driving voltage $V_{OUT}$ commonly applied to the LED arrays of the LED array unit 300, and generate the feedback signal $V_{OVP}$. The resistors R_OVPH and R_OVPL of the feedback unit 500 may have different resistance values according to the number and type of LEDs in the LED arrays of the LED array unit 300, because the target voltage Vout_target, illustrated in FIGS. 5-7, to be applied to the LED arrays of the LED array unit 300 differs according to the number and type of the LEDs of the LED arrays of the LED array unit 300.

While each of the LED arrays illustrated in FIG. 2 includes six LEDs by way of example, a smaller or greater number of LEDs may be included in the LED arrays. The feedback unit 500 includes two different resistors R_OVPH and R_OVPL by way of example. If the feedback unit 500 can provide the feedback voltage to the PWM controlling circuit 100 as the feedback signal $V_{OVP}$, the feedback unit 500 may include a greater or smaller number of resistors.

FIG. 3 is a circuit diagram illustrating an example of a PWM controlling circuit 100 and a LED driver 400 according to a general aspect. Referring to FIG. 3, the PWM controlling circuit 100 generates the PWM signal PWM_OUT provided to the driving voltage generator 200, and includes a voltage detector 110, a controller 120, and a PWM signal generator 130.

The voltage detector 110 is connected to the LED arrays CH1 through CH4 of via the LED driver 400. The voltage detector 110 receives the feedback voltages $V_{FB1}$ through $V_{FB4}$ from each LED array CH1 through CH4, and determines the connection status of the LED arrays CH1 through CH4 according to the levels of the received feedback voltages $V_{FB1}$ through $V_{FB4}$. Herein, the feedback voltage $V_{FB1}$ through $V_{FB4}$ of each of the LED arrays CH1 through CH4 indicates the drain voltage of the sink transistor 410 to drive the LED arrays CH1 through CH4.

For example, the voltage detector 110 determines the connection status of the LED arrays CH1 through CH4 by comparing the feedback voltages $V_{FB1}$ through $V_{FB4}$ of the LED arrays CH1 through CH4 and a preset voltage Vref_open. Herein, the connection status of the LED arrays CH1 through CH4 indicates whether the LED arrays CH1 through CH4 are open (disconnected) according to the open or the close of the LED.

That is, as the driving voltage $V_{OUT}$ supplied to the LED arrays CH1 through CH4 increases, the feedback voltages $V_{FB1}$ through $V_{FB4}$ of the LED arrays CH1 through CH4 should increase as well. However, when the driving voltage $V_{OUT}$ applied to the LED arrays CH1 through CH4 increases and the feedback voltages $V_{FB1}$ through $V_{FB4}$ of the LED arrays CH1 through CH4 do not increase and approach the preset voltage Vref_open (for example, 0V or 0.2V), the voltage detector 110 determines the open of the corresponding LED array.

The voltage detector 110 can detect and output a feedback voltage Vamp_fb_1 to boost the initial driving voltage applied to the LED arrays CH1 through CH4. Herein, the feedback voltage Vamp_fb_1 indicates the minimum drain voltage of the drain voltages of the sink transistor 410 of the LED driver 400 to drive the LED arrays CH1 through CH4, or the minimum feedback voltage of the feedback voltages $V_{FB1}$ through $V_{FB4}$ of the LED arrays CH1 through CH4. The feedback voltage Vamp_fb_1 may be set to ground (GND) level until a certain status of the initial boosting of the LED arrays CH1 through CH4 is reached.

For example, when determining that none of the LED arrays CH1 through CH4 are connected, the voltage detector 110 sets the feedback voltage Vamp_fb_1 to the GND level until the driving voltage $V_{OUT}$ supplied to the LED arrays CH1 through CH4 reaches a preset voltage V_ovp_TH. When determining that at least one LED array is connected, the voltage detector 110 sets the feedback voltage Vamp_fb_1 to the GND level until the feedback voltage Vamp_fb_2, which is input into a comparator 122 in the controller 120, reaches a preset voltage Vref2.

As is illustrated in FIGS. 5-7, the preset voltage V_ovp_TH indicates the voltage to prevent the overvoltage supply to the LED arrays CH1 through CH4 according to the external overvoltage protection, and can be set to two different voltages V_ovp_TH1 and V_ovp_TH2 of hysteresis property. The preset voltage V_ovp_TH can differ according to the number of the LEDs forming the LED arrays CH1 through CH4. The preset voltage Vref2 is the voltage for preventing the overvoltage supply to the LED arrays CH1 through CH4 according to the internal overvoltage protection.

Next, as is illustrated in FIGS. 5-7, when the driving voltage $V_{OUT}$ supplied to the LED arrays CH1 through CH4 reaches the preset voltage V_ovp_TH or the feedback voltage Vamp_fb_2 reaches the preset voltage Vref2, the voltage detector 110 outputs the minimum drain voltage of the drain voltages of the sink transistor 410 of the LED driver 400 to drive the LED arrays CH1 through CH4, or the minimum feedback voltage of the feedback voltages $V_{FB1}$ through $V_{FB4}$ of the LED arrays CH1 through CH4, as the feedback voltage Vamp_fb_1. The voltage detector 110 detects and outputs the feedback voltage Vamp_fb_2 to prevent the overvoltage supply to the LED arrays CH1 through CH4 and to increase the driving voltage $V_{OUT}$ applied to the LED arrays CH1 through CH4 to a preset voltage. For example, when determining that at least one LED array is connected, the voltage detector 110 outputs the minimum feedback voltage of the feedback voltages of the LED arrays CH1 through CH4 that are connected, that is, the minimum drain voltage of the drain voltages of the sink transistor 410 of the LED driver 400 connected to the LED arrays CH1 through CH4 that are connected, as the feedback voltage Vamp_fb_2.

As stated above, the voltage detector 110 detects the minimum drain voltage of the drain voltages of the sink transistor 410 of the LED driver 400 of the LED arrays CH1 through CH4, or the minimum feedback voltage of the feedback voltages $V_{FB1}$ through $V_{FB4}$ of the LED arrays CH1 through CH4, and outputs the feedback voltage Vamp_fb_1 to initially boost of the LED arrays CH1 through CH4. When at least one LED array is connected, the voltage detector 110 outputs the feedback voltage Vamp_fb_2 to prevent the overvoltage applied to the LED arrays CH1 through CH4 according to the internal overvoltage protection and to increase the driving voltage $V_{OUT}$ applied to the LED arrays CH1 through CH4 to a preset voltage.

The controller 120 may generate a first control signal OVPO and a second control signal VOUTO to control the boosting of the LED arrays CH1 through CH4 according to the connection status of the LED arrays, and output the generated control signals to the PWM signal generator 130. For example, when determining that none of the LED arrays CH1 through CH4 are connected, the controller 120 outputs the first control signal OVPO to abort the boosting of the LED arrays CH1 through CH4 according to a feedback signal $V_{OVP}$ generated by the feedback unit 500 of FIG. 2. In addition, when determining that at least one of the LED arrays CH1 through CH4 is connected, the controller 120 outputs the second control signal VOUTO to control the boosting of the LED arrays CH1 through CH4 according to the minimum feedback voltage of the feedback voltages of the LED arrays CH1 through CH4 that are connected, that is, the minimum drain voltage of the drain voltages of the sink transistor 410 of the LED driver 400 to drive the LED arrays CH1 through CH4.

The controller 120 may include a first comparator 121 and a second comparator 122. The first comparator 121 generates the first control signal OVPO by receiving the feedback signal $V_{OVP}$ generated by the feedback unit 500 of FIG. 2 and the preset voltage. For example, when the feedback voltage generated by the feedback unit 500 as the feedback signal $V_{OVP}$ reaches the preset voltage Vref1, the first comparator 121 generates the high control signal OVPO. Herein, the preset voltage Vref1 indicates the voltage for determining whether the driving voltage $V_{OUT}$ supplied to the LED arrays CH1 through CH4 reaches the preset voltage V_ovp_TH using the feedback voltage generated by the feedback unit 500 as the feedback signal $V_{OVP}$, and may be set to two different voltages Vref1_H and Vref1_L of 1.35 V and 1.25 V, respectively, according to the hysteresis property. Hence, when the driving voltage $V_{OUT}$ supplied to the LED arrays CH1 through CH4 reaches the preset voltage V_ovp_TH, the first comparator 121 generated the high control signal OVPO.

When determining that at least one LED array is connected, the second comparator 122 generates the second control signal VOUTO by receiving the minimum feedback voltage Vamp_fb_2 of the LED arrays CH1 through CH4 that are connected and the preset voltage Vref2. For example, when the minimum feedback voltage Vamp_fb_2 of the LED arrays CH1 through CH4 that are connected, that is, the minimum drain voltage Vamp_fb_2 of the drain voltages of the sink transistor 410 of the LED driver 400 to drive the LED arrays CH1 through CH4 that are connected, reaches the preset voltage Vref2, the second comparator 122 generates the second control signal VOUTO of the high state. Herein, the preset voltage Vref2 indicates the voltage V_FB_target*0.93 less than the voltage V_FB_target to operate the sink transistor 410 of the LED driver 400 to drive the LED arrays CH1 through CH4 that are connected in the saturation region.

The PWM signal generator 130 may generate the PWM signal PWM_OUT provided to the driving voltage generator 200 by receiving the first control signal OVPO and the second control signal VOUTO. For example, when receiving the first control signal OVPO of the high state, the PWM signal generator 130 generates the PWM signal PWM_OUT to abort the boosting.

When receiving the second control signal VOUTO of the high state, the PWM signal generator 130 generates the PWM signal PWM_OUT to control the boosting according to the on/off state of the dimming signal PWMI. Moreover, when the dimming signal PWMI is off, the PWM signal generator 130 generates a PWM signal PWM_OUT to abort the boosting of the LED arrays CH1 through CH4. When the dimming signal PWMI is on, the PWM signal generator 130 generates a PWM signal PWM_OUT to boost the feedback voltage of the LED arrays CH1 through CH4 to the voltage to operate the sink transistor 410 of the LED driver 400 to drive the LED arrays CH1 through CH4 that are connected in the saturation region.

The PWM signal generator 130 includes a third comparator 131, a switch 132, a fourth comparator 133, a PWM controller 134, an OR gate, an oscillator 136, an RS flip-flop 137, and a buffer 138. The third comparator 131 receives and outputs the feedback voltage Vamp_fb_1 of the LED arrays CH1 through CH4 and the preset voltage $V_{REF}$ to the switch 132. For example, when the feedback voltage Vamp_fb_1 of the LED arrays CH1 through CH4 is less than the preset voltage $V_{REF}$, the third comparator 131 outputs a signal to boost the driving voltage $V_{OUT}$ applied to the LED arrays CH1 through CH4. When the feedback voltage Vamp_fb_1 of the LED arrays CH1 through CH4 is greater than the preset voltage $V_{REF}$, the third comparator 131 outputs a signal to abort the boosting of the driving voltage $V_{OUT}$ applied to the LED arrays CH1 through CH4. Herein, the preset voltage $V_{REF}$ indicates the voltage to operate the sink transistor 410 of the LED driver 400 to drive the LED arrays CH1 through CH4 in the saturation region. As such, the preset voltage $V_{REF}$ is defined to give constant brightness to the LED arrays CH1 through CH4 by flowing the constant current in the LED array unit 300 of FIG. 2.

Meanwhile, the feedback voltage Vamp_fb_1 is set to the GND level until the driving voltage $V_{OUT}$ applied to the LED arrays CH1 through CH4 reaches the preset voltage V_ovp_TH or the feedback voltage Vamp_fb_2 reaches the preset voltage Vref2 as mentioned earlier. Accordingly, the third comparator 131 outputs the signal to boost the voltage applied to the LED arrays CH1 through CH4 until the driving voltage $V_{OUT}$ applied to the LED arrays CH1 through CH4 reaches the preset voltage V_ovp_TH or the feedback voltage Vamp_fb_2 reaches the preset voltage Vref2.

The switch 132 receives the output of the third comparator 131 and the second control signal VOUTO, and provides an output to the fourth comparator 133. For example, the switch 132 outputs a signal to boost the voltage applied to the LED arrays CH1 through CH4 when the dimming signal PWMI is on at the rising edge of the second control signal VOUTO, and outputs a signal to abort the boosting of the voltage applied to the LED arrays CH1 through CH4 when the dimming signal PWMI is off at the rising edge of the second control signal VOUTO.

The fourth comparator 133 receives the outputs of a Common Source (CS) stage (FIG. 2) of the transistor of the driving voltage generator 200 of FIG. 2 and the switch 132, and provides an output to the PWM controller 134. The fourth comparator 133 compares the current flowing through the CS stage and the output of the switch 132 and output a signal to boost the voltage applied to the LED arrays CH1 through CH4 or a signal to abort the boosting.

The PWM controller 134 receives and provides the output of the fourth comparator 133 to the OR gate 135. The OR gate 135 receives the control signal OVPO generated by the controller 120 and the output signal of the PWM controller 134, and provides an output to the RS flip-flop 137. The oscillator 136 generates a clock signal having a preset frequency.

The RS flip-flop 137 receives the clock signal of the oscillator 136 as the set input and the output of the OR gate 135 as the reset input. The RS flip-flop 137 provides the PWM signal PWM_OUT to the driving voltage generator 200 of FIG. 2 via the buffer 138. Herein, the RS flip-flop 137 is a flip-flop to output the high state when the set signal is input and the low state when the reset signal is input. That is, the PWM signal generator 130 generates the PWM signal PWM_OUT to boost the driving voltage $V_{OUT}$ applied to the LED arrays CH1 through CH4 according to the clock signal of the oscillator 135, which continues until the feedback voltage Vamp_fb_1 reaches the preset voltage $V_{REF}$.

Meanwhile, when none of the LED arrays CH1 through CH4 are connected and the driving voltage $V_{OUT}$ applied to the LED arrays CH1 through CH4 reaches the preset voltage V_ovp_TH, the PWM signal generator 130 generates a PWM signal PWM_OUT to abort the boosting with the first control signal OVPO. When at least one LED array is connected and the minimum feedback voltage of the LED arrays CH1 through CH4 that are connected, that is, the minimum drain voltage of the sink transistor 410 of the LED driver 400 to drive the LED arrays CH1 through CH4 that are connected, reaches the preset voltage Vref2, the PWM signal generator 130 generates a PWM signal PWM_OUT to control the boosting with the second control signal VOUTO.

For example, when the dimming signal PWMI is on when the minimum feedback voltage of the LED arrays CH1 through CH4 reaches the preset voltage Vref2, the driving voltage $V_{OUT}$ applied to the LED arrays CH1 through CH4 is boosted to the preset voltage $V_{REF}$ to operate the sink transistor 410 of the LED driver 400 to drive the LED arrays CH1 through CH4 in the saturation region. Yet, when the dimming signal PWMI is off when the minimum feedback voltage of the LED arrays CH1 through CH4 reaches the preset voltage Vref2, the boosting is aborted and the minimum feedback voltage of the LED arrays CH1 through CH4 is maintained at the preset voltage Vref2. Next, when the dimming signal PWMI is on, the driving voltage $V_{OUT}$ applied to the LED arrays CH1 through CH4 is boosted to the preset voltage $V_{REF}$ to operate the sink transistor 410 of the LED driver 400 to drive the LED arrays CH1 through CH4 in the saturation region.

Figure 4:
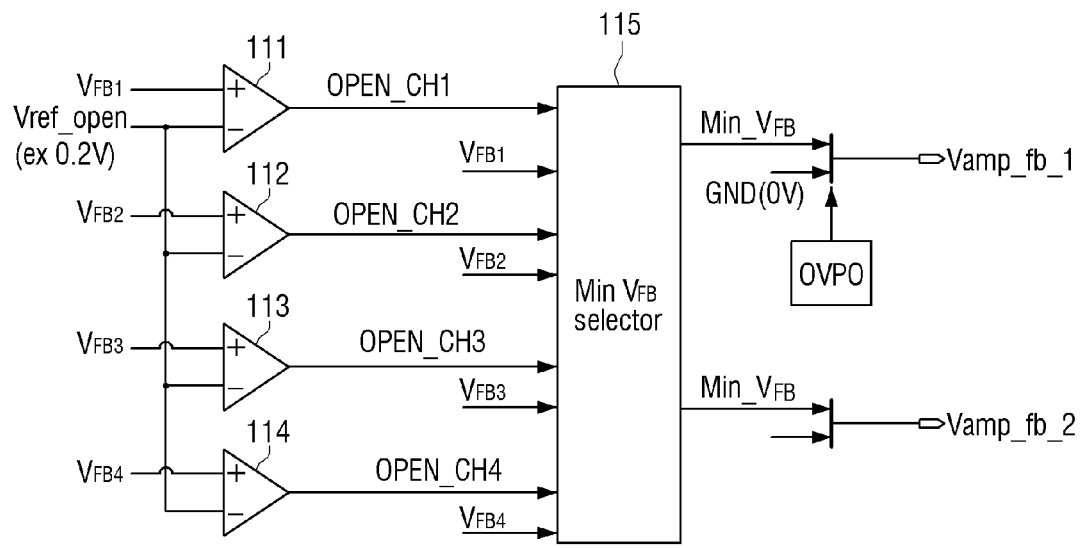
FIG. 4 is a circuit diagram illustrating an example of operations of a voltage detector according to a general aspect.

FIG. 4 is a circuit diagram for illustrating an example of operations of the voltage detector 110 according to a general aspect. Referring to FIG. 4, the feedback voltages $V_{FB1}$ through $V_{FB4}$ of the four LED arrays CH1 through CH4 are input to the comparators 111 through 114. The comparators 111 through 114 compare the feedback voltages $V_{FB1}$ through $V_{FB4}$ and the preset voltage Vref_open (for example, 0V or 0.2V), determine the connection status of the LED arrays CH1 through CH4, and output the connection status to a minimum feedback voltage selector 115. The minimum feedback voltage selector 115 detects and outputs the minimum feedback voltage $Min\_V_{FB}$ of the feedback voltages $V_{FB1}$ through $V_{FB4}$ of the LED arrays CH1 through CH4 using the outputs of the comparators 111 through 114 and the feedback voltages $V_{FB1}$ through $V_{FB4}$ of the LED arrays CH1 through CH4.

For example, when none of the LED arrays CH1 through CH4 are connected, the minimum feedback voltage selector 115 outputs the lowest voltage of the feedback voltages $V_{FB1}$ through $V_{FB4}$ of the unconnected of the LED arrays CH1 through CH4, as the minimum feedback voltage $Min\_V_{FB}$. When at least one of the LED arrays CH1 through CH4 is connected, the minimum feedback voltage selector 115 outputs the lowest voltage of the feedback voltages $V_{FB1}$ through $V_{FB4}$ of the LED arrays CH1 through CH4 that are connected, as the minimum feedback voltage $Min\_V_{FB}$. In this case, the minimum feedback voltage selector 115 excludes the feedback voltage of the disconnected of the LED arrays CH1 through CH4 based on the outputs of the comparators 111 through 114, and detects and outputs the minimum feedback voltage $Min\_V_{FB}$ of the feedback voltages $V_{FB1}$ through $V_{FB4}$ of the LED arrays CH1 through CH4 that are connected.

The voltage detector 110 outputs the feedback voltage Vamp_fb_1 and the feedback voltage Vamp_fb_2 based on the minimum feedback voltage $Min\_V_{FB}$. For example, the feedback voltage Vamp_fb_1 is the voltage to boost the initial driving voltage applied to the LED arrays CH1 through CH4 when none of the LED arrays CH1 through CH4 are connected or at least one of the LED arrays CH1 through CH4 is connected. Thus, when none of the LED arrays CH1 through CH4 are connected or at least one of the LED arrays CH1 through CH4 is connected, the voltage detector 110 outputs the minimum feedback voltage $Min\_V_{FB}$ at the GND level until the first control signal OVPO is high. When the first control signal OVPO is high, the voltage detector 110 generates the feedback voltage Vamp_fb_1 by outputting the minimum drain voltage of the drain voltages of the sink transistor 410 of the LED driver 400 to drive the LED arrays CH1 through CH4 according to the driving voltage $V_{OUT}$ applied to the LED arrays CH1 through CH4.

Meanwhile, the feedback voltage Vamp_fb_2 indicates the minimum drain voltage of the drain voltages of the sink transistor 410 of the LED driver 400 to drive the LED arrays CH1 through CH4 according to the driving voltage $V_{OUT}$ applied to the LED arrays CH1 through CH4. Hence, the voltage detector 110 generates the feedback voltage Vamp_fb_2 by outputting the minimum drain voltage of the sink transistor 410 of the LED driver 400 to drive the LED arrays CH1 through CH4 that are connected when at least one of the LED arrays CH1 through CH4 is connected.

Now, the operations of the LED driver circuit 1000 according to a general aspect are described by referring to FIGS. 5 through 8. FIGS. 5 through 8 are waveform diagrams illustrating example of operations of the LED driver circuit 1000 according to a general aspect. FIG. 5 depicts a Pulse Generator (PG) signal 501, a dimming signal PWMI 502, a first control signal OVPO 503, a second control signal VOUTO 504, a PWM signal PWM_OUT 505, $V_{OUT}$ 506, and Vamp_fb_1 and Vamp_fb_2 507. FIG. 6 depicts a Pulse Generator (PG) signal 601, a dimming signal PWMI 602, a first control signal OVPO 603, a second control signal VOUTO 604, a PWM signal PWM_OUT 605, $V_{OUT}$ 606, and Vamp_fb_1 and Vamp_fb_2 607. FIG. 7 depicts a Pulse Generator (PG) signal 701, a dimming signal PWMI 702, a first control signal OVPO 703, a second control signal VOUTO 704, a PWM signal PWM_OUT 705, $V_{OUT}$ 706, and Vamp_fb_1 and Vamp_fb_2 707.

Herein, the $V_{OUT}$ 506, 606, 706 indicates the driving voltage applied to the LED array unit 300, and the Vamp_fb_1 and Vamp_fb_2 507, 607, 707 indicates the feedback voltage of the LED arrays of the LED array unit 300, that is, the drain voltage of the sink transistor 410 of the LED driver 400 to drive the LED arrays of the LED array unit 300.

FIG. 5 is a waveform diagram illustrating examples of operations of the LED driver circuit 1000 when none of the LED arrays are connected.

First, the PG signal 501 is input for the LED IC operation. The PWM controlling circuit 100 generates the PWM signal 505 to control the initial boosting of the LED arrays of the LED array unit 300. For example, the PWM controlling circuit 100 generates the high PWM signal PWM_OUT 505 at the oscillator 135 that generates the clock signal of the preset frequency. Thus, the driving voltage $V_{OUT}$ applied to the LED array unit 300 is boosted.

In the meantime, when determining that none of the LED arrays of the LED array unit 300 are connected, the feedback voltage Vamp_fb_1 is set to the GND level until the driving voltage $V_{OUT}$ applied to the LED arrays of the LED array unit 300 reach the preset voltage V_ovp_TH. Hence, since the feedback voltage Vamp_fb_1 is less than the reference voltage $V_{REF}$ to operate the sink transistor 410 of the LED driver 300 to drive the LED arrays of the LED array unit 300 in the saturation region, the driving voltage $V_{OUT}$ applied to the LED arrays of the LED array unit 300 continuously rises. Herein, the preset voltage V_ovp_TH can be set to two different voltages V_ovp_TH1 and V_ovp_TH2 according to the hysteresis property.

Since none of the LED arrays of the LED array unit 300 are connected, the PWM controlling circuit 100 generates the PWM signal PWM_OUT 505 to abort the boosting by comparing the feedback voltage $V_{OVP}$ generated by the feedback unit 500 and the preset voltage Vref1. For example, when the feedback voltage $V_{OVP}$ generated by the feedback unit 500 reaches the preset voltage Vref1, the controller 120 generates the high control signal OVPO 503. The high control signal OVPO 503 is input to the reset of the RS flip-flop 137 via the OR gate 135, and the high PWM signal PWM_OUT 505 becomes low.

Accordingly, the PWM controlling circuit 100 generates the low PWM signal PWM_OUT 505 to the driving voltage generator 200 so that the LED array boosting of the driving voltage generator 200 is aborted. That is, upon determining that none of the LED arrays of the LED array unit 300 are connected, the LED driver circuit 1000 may control not to apply the overvoltage to the LED arrays of the LED array unit 300 by generating the first control signal OVPO using the feedback voltage $V_{OVP}$ generated by the feedback unit 500. Referring to FIG. 5, none of the LED arrays of the LED array unit 300 are connected. Although the driving voltage $V_{OUT}$ applied to the LED arrays of the LED array unit 300 rises, the feedback voltage Vamp_fb_2 does not increase but stays 0V (or 0.2V) and thus the second control signal VOUTO is not generated.

FIG. 6 is a waveform diagram illustrating examples of operations of the LED driver circuit 1000 when the dimming signal PWMI 602 is on and at least one of the LED arrays of the LED array unit 300 is connected. First, the PG signal 601 is input for the LED IC operation. The PWM controlling circuit 100 generates the PWM signal PWM_OUT 605 to control the initial boosting of the LED arrays of the LED array unit 300. For example, the PWM controlling circuit 100 generates the high PWM signal PWM_OUT 605 at the oscillator 135 which generates the clock signal of the preset frequency, and thus the driving voltage $V_{OUT}$ applied to the LED arrays of the LED array unit 300 is boosted.

In the meantime, when determining that at least one of the LED arrays of the LED array unit 300 is connected, the feedback voltage Vamp_fb_1 is set to the GND level until the feedback voltage Vamp_fb_2 reaches the preset voltage Vref2. Hence, since the feedback voltage Vamp_fb_1 is less than the reference voltage $V_{REF}$ to operate the sink transistor 410 of the LED driver 400 to drive the LED arrays of the LED array unit 300 in the saturation region, the driving voltage $V_{OUT}$ applied to the LED arrays of the LED array unit 300 continuously rises.

Since at least one of the LED arrays of the LED array unit 300 is connected, the PWM controlling circuit 100 generates the PWM signal PWM_OUT 605 to control the boosting by comparing the minimum feedback voltage Vamp_fb_2 of the feedback voltages of the LED arrays of the LED array unit 300 that are connected and the preset voltage Vref2. For example, when the minimum feedback voltage Vamp_fb_2 of the feedback voltages of the LED arrays of the LED array unit 300 that are connected, that is, the minimum drain voltage of the drain voltages of the sink transistor 410 of the LED driver 400 to drive the LED arrays of the LED array unit 300 that are connected, reaches the preset voltage Vref2, the controller 120 generates the second control signal VOUTO 604 of the high state. Herein, the preset voltage Vref2 is the voltage V_FB_target*0.93 less than the voltage V_FB_target to operate the sink transistor 410 of the LED driver 400 in the saturation region.

Meanwhile, since the dimming signal PWMI 602 is on at the rising edge of the second control signal VOUTO 604, the PWM controlling circuit 100 generates the PWM signal PWM_OUT 605 to continue the boosting until the driving voltage $V_{OUT}$ applied to the LED arrays of the LED array unit 300 reaches a target voltage Vout_target.

FIG. 7 is a waveform diagram illustrating examples of operations of the LED driver circuit 1000 when the dimming signal PWMI 702 is off and at least one of the LED arrays of the LED array unit 300 is connected. First, the PG signal 701 is input for the LED IC operation. The PWM controlling circuit 100 generates the PWM signal PWM_OUT 705 to control the initial boosting of the LED arrays of the LED array unit 300. For example, the PWM controlling circuit 100 generates the high PWM signal PWM_OUT 705 at the oscillator 135 which generates the clock signal of the preset frequency, and thus the driving voltage $V_{OUT}$ applied to the LED arrays of the LED array unit 300 is boosted.

In the meantime, when determining that at least one of the LED arrays of the LED array unit 300 is connected, the feedback voltage Vamp_fb_1 is set to the GND level until the feedback voltage Vamp_fb_2 reaches the preset voltage Vref2. Hence, since the feedback voltage Vamp_fb_1 is less than the reference voltage $V_{REF}$ to operate the sink transistor 410 of the LED driver 400 to drive the LED arrays of the LED array unit 300 in the saturation region, the driving voltage $V_{OUT}$ applied to the LED arrays of the LED array unit 300 continuously rises.

Since at least one of the LED arrays of the LED array unit 300 is connected, the PWM controlling circuit 100 generates the PWM signal PWM_OUT 705 to control the boosting by comparing the minimum feedback voltage Vamp_fb_2 of the feedback voltages of the LED arrays of the LED array unit 300 that are connected and the preset voltage Vref2. For example, when the minimum feedback voltage Vamp_fb_2 of the feedback voltages of the LED arrays of the LED array unit 300 that are connected, that is, the minimum drain voltage of the drain voltages of the sink transistor 410 of the LED driver 400 to drive the LED arrays of the LED array unit 300 that are connected, reaches the preset voltage Vref2, the controller 120 generates the second control signal VOUTO 704 of the high state. Herein, the preset voltage Vref2 is the voltage V_FB_target*0.93 less than the voltage V_FB_target to operate the sink transistor 410 of the LED driver 400 in the saturation region.

Meanwhile, since the dimming signal PWMI 702 is off at the rising edge of the second control signal VOUTO 704, the PWM controlling circuit 100 generates the PWM signal PWM_OUT 705 to abort the boosting of the driving voltage $V_{OUT}$ applied to the LED arrays of the LED array unit 300. Next, the PWM controlling circuit 100 generates the PWM signal PWM_OUT 705 to boost the driving voltage $V_{OUT}$ applied to the LED arrays of the LED array unit 300 until the driving voltage $V_{OUT}$ applied to the LED arrays of the LED array unit 300 reaches the target voltage Vout_target when the dimming signal PWMI 702 is on.

As such, by aborting the boosting of the LED array driving voltage $V_{OUT}$ when the dimming signal PWMI 702 is off, it is possible to prevent the abrupt rise of the feedback voltage of the LED arrays, that is, the drain voltage of the sink transistor 410 of the LED driver 400 to drive the LED arrays.

In FIGS. 6 and 7, after the driving voltage $V_{OUT}$ applied to the LED arrays of the LED array unit 300 reaches the target voltage Vout_target, the PWM controlling circuit 100 generates the PWM signal PWM_OUT 605, 705 to control the boosting of the driving voltage $V_{OUT}$ applied to the LED arrays of the LED array unit 300 using the minimum feedback voltage Vamp_fb_1 of the feedback voltages of the LED arrays of the LED array unit 300 that are connected.

Herein, when the driving voltage $V_{OUT}$ applied to the LED arrays of the LED array unit 300 reaches the preset voltage V_ovp_TH or the feedback voltage Vamp_fb_2 reaches the preset voltage Vref2, the feedback voltage Vamp_fb_1 is set to the minimum drain voltage of the drain voltages of the sink transistor 410 of the LED driver 400 to drive the LED arrays of the LED array unit 300, and then output.

Thus, the PWM controlling circuit 100 can generate the signal to control the LED array boosting using the feedback voltage Vamp_fb_1 so that the sink transistor 410 driving the LED arrays operates in the saturation region. For example, when the feedback voltage Vamp_fb_1 is less than the voltage $V_{REF}$ to operate the sink transistor 410 of the LED driver 400 in the saturation region, the PWM controlling circuit 100 may output the high PWM signal PWM_OUT 605, 705 and generate the signal for commencing the LED array boosting. When the feedback voltage Vamp_fb_1 is greater than the voltage $V_{REF}$ to operate the sink transistor 410 of the LED driver 400 in the saturation region, the PWM controlling circuit 100 may generate the signal for aborting the LED array boosting. Thus, the LED driver circuit 1000 can operate in a regulation mode.

Figure 8:
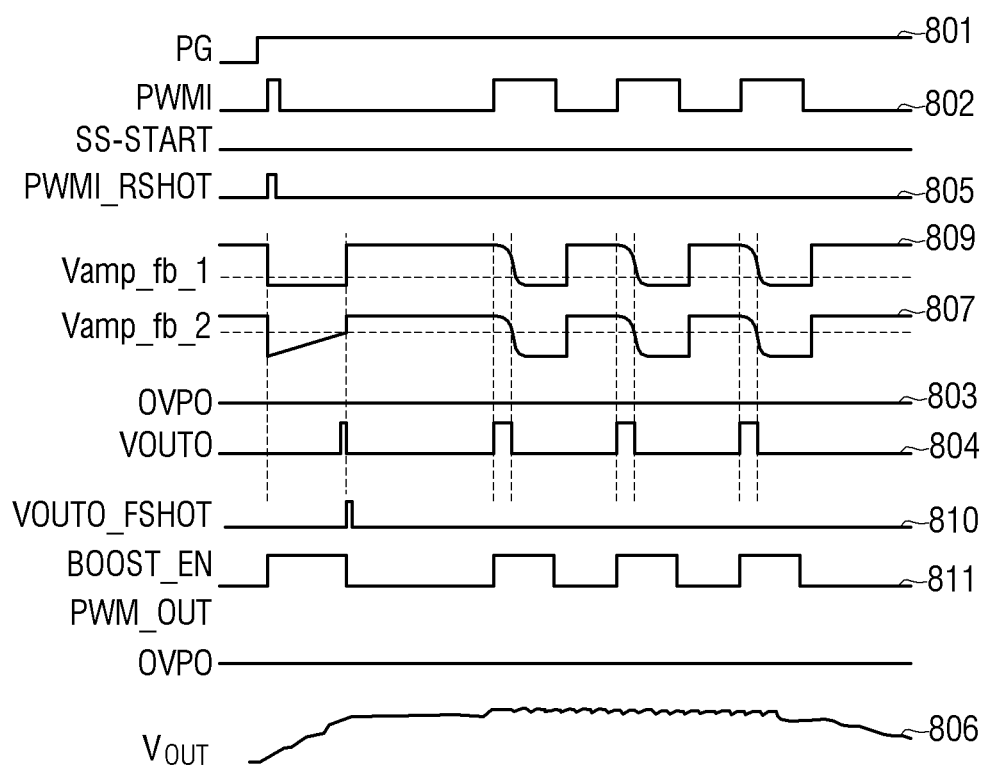

FIG. 8 is a waveform diagram illustrating examples of operations of the LED driver circuit 1000 according to a general aspect. In FIG. 8, the descriptions overlapping in FIGS. 5, 6, and 7 shall be omitted.

Referring to FIG. 8, when a dimming signal PWMI 802 has the rising edge, PWMI_RSHOT 805 has the rising edge and a BOOST_EN signal 811 also has the rising edge. Since the feedback voltage Vamp_fb_1 809 is set to the GND level until the LED array driving voltage $V_{OUT}$ 806 reaches the preset voltage V_ovp_TH, the LED driver circuit 1000 boosts the LED array driving voltage $V_{OUT}$ 806 using the feedback voltage Vamp_fb_1 809.

Meanwhile, as the LED array driving voltage $V_{OUT}$ 806 increases, the feedback voltage Vamp_fb_2 807 rises. When the feedback voltage Vamp_fb_2 807 reaches the preset voltage Vref2, the PWM controlling circuit 100 generates the second control signal VOUTO 804 having the rising edge.

Since the dimming signal PWMI 802 is off at the rising edge of the second control signal VOUTO 804, the PWM signal PWM_OUT 811 has the falling edge and thus the boosting of the LED array driving voltage $V_{OUT}$ 806 is terminated.

Next, when the dimming signal PWMI 802 is on at the rising edge, the PWM signal PWM_OUT 811 has the rising edge and thus the driving voltage $V_{OUT}$ 806 applied to the LED arrays of the LED array unit 300 is boosted up to the target voltage Vout_target.

In the light of the foregoing, the boosting of the driving voltage $V_{OUT}$ 806 applied to the LED arrays of the LED array unit 300 can be controlled using the feedback voltage of the LED arrays of the LED array unit 300 or the $V_{OUT}$ 806 applied to the LED arrays of the LED array unit 300 according to the connection status of the LED arrays of the LED array unit 300. Therefore, even when the number of the LED elements of the LED arrays is changed according to the change of the LED inch, it is possible to avoid application of the overvoltage to the LED arrays using the feedback voltage of the LED arrays to thus reduce the development process and cost in the LED module development.

Further, after the drain voltage of the sink transistor 410 of the LED driver to drive the LED arrays of the LED array unit 300 is increased to the preset voltage, the boosting of the LED arrays of the LED array unit 300 can be controlled according to the on/off state of the dimming signal PWMI 802. Therefore, the time taken to boost the driving voltage $V_{OUT}$ 806 applied to the LED arrays of the LED array unit 300 can be shortened.

According to the teachings above, there is provided an LED driver circuit that may determine the connection status of the LED arrays of the LED array unit, and prevent overvoltage from being applied to the LED arrays of the LED array unit by using the minimum feedback voltage of LED arrays that are connected. As a result, when at least one LED array is connected, a separate external device to prevent overvoltage applied to the LED arrays of the LED array unit is unnecessary. Therefore, it may be possible to reduce the required cost when an external device to control overvoltage is changed or omitted in the development and test processes. The LED driver circuit may increase the drain voltage of the sink transistor of the LED driver to drive the LED arrays of the LED array unit to a preset voltage and control the boosting of the LED arrays according to the on/off state of the dimming signal to thereby shorten the time taken to increase the driving voltage of the LED arrays.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A Light Emitting Diode (LED) driver circuit, comprising:
a voltage detector connected to a plurality of LED arrays, the voltage detector being configured to:
receive a feedback voltage from each of the LED arrays;
determine a connection status of each of the LED arrays according to a corresponding level of the feedback voltage; and
detect a minimum feedback voltage from feedback voltages of the LED arrays that are determined to be connected;
a controller configured to output a control signal to one of abort and control boosting of the LED arrays according to the detected minimum feedback voltage;
a Pulse Width Modulation (PWM) signal generator configured to output a PWM signal corresponding to the outputted control signal according to an on/off state of a dimming signal that drives the LED arrays that are determined to be connected; and
a driving voltage generator configured to commonly apply a driving voltage to the LED arrays according to the outputted PWM signal.

2. The LED driver circuit of claim 1, further comprising:
a feedback unit configured to:
detect the driving voltage commonly applied to the LED arrays; and
output a feedback signal to the controller according to the detected driving voltage,
wherein, when determining that none of the LED arrays are connected, the controller outputs the control signal to abort the boosting according to the feedback signal.

3. The LED driver circuit of claim 2, wherein the controller comprises:
a comparator configured to:
compare the feedback signal and a preset voltage; and
generate the control signal according to the comparison.

4. The LED driver circuit of claim 3, wherein:
the controller generates a high control signal when the feedback signal is greater than the preset voltage; and
when the high control signal is input to the PWM signal generator, the PWM signal generator generates the PWM signal corresponding to the control signal to abort the boosting.

5. The LED driver circuit of claim 1, wherein the driving voltage detector is further configured to:
compare the feedback voltage of each of the LED arrays and a preset voltage; and
determine the connection status of each of the LED arrays according to the comparison.

6. The LED driver circuit of claim 5, wherein the preset voltage is 0 V or 0.2 V.

7. The LED driver circuit of claim 1, wherein the driving voltage is a target voltage supplied to the LED arrays to operate a transistor that, in a saturation region, drives the LED arrays that are determined to be connected.

8. The LED driver circuit of claim 7, wherein a drain voltage of the transistor is increased to control the boosting of the LED arrays according to the on/off state of the dimming signal.

9. The LED driver circuit of claim 1, wherein the controller comprises:
a comparator configured to:
compare the minimum feedback voltage and a preset voltage, the preset voltage being less than a voltage to operate a transistor that, in a saturation region, drives the LED arrays that are determined to be connected; and
generate the control signal according to the comparison.

10. The LED driver circuit of claim 9, wherein:
the controller generates a high control signal when one of the feedback voltages of the LED arrays that are determined to be connected is greater than the preset voltage; and
when the high control signal is input to the PWM signal generator and the dimming signal is on, the PWM signal generator generates the PWM signal corresponding to the control signal to control the boosting.

11. The LED driver circuit of claim 10, wherein the PWM signal generator generates the PWM signal corresponding to the control signal to abort the boosting when the dimming signal is off.

12. The LED driver circuit of claim 10, wherein the PWM signal corresponding to the control signal to control the boosting boosts the feedback voltage of the LED arrays that are determined to be connected to a voltage to operate the transistor that, in a saturation region, drives the LED arrays that are determined to be connected.

13. A Pulse Width Modulation (PWM) controlling circuit, comprising:
a voltage detector connected to a plurality of Light Emitting Diode (LED) arrays, the voltage detector being configured to:
receive a feedback voltage from each of the LED arrays;
determine a connection status of each of the LED arrays according to a corresponding level of the feedback voltage; and
output a control voltage to control boosting of the LED arrays according to the feedback voltages of the LED arrays that are determined to be connected; and
a PWM signal generator configured to output a PWM signal corresponding to the outputted control voltage to control the boosting of the LED arrays according to an on/off state of a dimming signal that drives the LED arrays that are determined to be connected.

14. A Light Emitting Diode (LED) driver circuit, comprising:
an LED array unit comprising a plurality of LED arrays;
a driving voltage generator configured to provide a driving voltage to the LED array unit; and
a Pulse Width Modulation (PWM) controlling circuit configured to boost the driving voltage to the LED array unit if a dimming signal is on and one or more of the LED arrays is connected, the PWM controlling circuit being configured to:
receive a feedback voltage from each of the LED arrays; and
determine from the received feedback voltage if one or more of the LED arrays is connected.

15. The LED driver circuit of claim 14, wherein the PWM controlling circuit comprises a PWM signal generator configured to:
determine whether the dimming signal is on;
receive a control signal corresponding to whether one or more of the LED arrays is connected;
output a first PWM signal to the driving voltage generator instructing the driving voltage generator to boost the driving voltage if:
the control signal indicates that one or more of the LED arrays is connected; and
the dimming signal is on; and
output a second PWM signal to the driving voltage generator instructing the driving voltage generator to abort boosting of the driving voltage if:
the control signal indicates that one or more of the LED arrays is not connected;
the dimming signal is off; or
a combination thereof.

16. The LED driver circuit of claim 14, wherein the PWM controlling circuit comprises:
a controller configured to:
receive a minimum feedback voltage of the feedback voltages provided from the LED arrays if one or more of the LED arrays is connected;
output a control signal to boost the driving voltage corresponding to the minimum feedback voltage; and
a PWM signal generator configured to:
receive the outputted control signal; and
output a PWM signal to the driving voltage generator to boost the driving voltage in accordance with the received control signal if the dimming signal is on.

* * * * *